US011353665B2

(12) United States Patent
Wang et al.

(10) Patent No.: US 11,353,665 B2
(45) Date of Patent: Jun. 7, 2022

(54) WIDE BANDWIDTH OPTICAL DETECTOR COMPRISING PLURAL PHASE TUNING ELEMENTS RESPECTIVELY RECEIVING OPTICAL SIGNALS FROM DIRECTIONAL COUPLERS

(71) Applicant: Thorlabs Quantum Electronics, Inc., Jessup, MD (US)

(72) Inventors: Jianfei Wang, Potomac, MD (US); Jacob Mertz, Elkridge, MD (US); Peter Heim, Washington, DC (US)

(73) Assignee: Thorlabs Quantum Electronics, Inc., Jessup, MD (US)

( * ) Notice: Subject to any disclaimer, the term of this patent is extended or adjusted under 35 U.S.C. 154(b) by 98 days.

(21) Appl. No.: 17/077,034

(22) Filed: Oct. 22, 2020

(65) Prior Publication Data

US 2021/0116651 A1    Apr. 22, 2021

Related U.S. Application Data

(60) Provisional application No. 62/924,421, filed on Oct. 22, 2019.

(51) Int. Cl.
*H04B 10/67* (2013.01)
*G02B 6/42* (2006.01)
(Continued)

(52) U.S. Cl.
CPC .......... *G02B 6/4206* (2013.01); *G01J 3/0297* (2013.01); *G01J 3/2803* (2013.01); *H04B 10/67* (2013.01); *H04J 14/02* (2013.01)

(58) Field of Classification Search
CPC ...... H04B 10/63; H04B 10/67; H04B 10/572; G01J 3/2803; G01J 9/0246; G02B 6/42; G02B 2006/12164; H04J 14/02
(Continued)

(56) References Cited

U.S. PATENT DOCUMENTS 10,666,016 B2 * 5/2020 Baehr-Jones ......... H01S 5/4012

FOREIGN PATENT DOCUMENTS

EP    3306836 A1    4/2018

OTHER PUBLICATIONS

The extended European search report and written opinion issued for corresponding European Patent Application No. 20202514.4, dated Mar. 4, 2021.
(Continued)

*Primary Examiner* — Que Tan Le
(74) *Attorney, Agent, or Firm* — Myers Wolin, LLC

(57) ABSTRACT

Disclosed are the method and system to derive the wavelength/frequency information covering wide wavelength or frequency range. Its practical applications include both fixed wavelength optical signal and wide bandwidth tunable or non-tunable optical signal, where the wavelength/frequency information is necessary for optical signal calibration, control, and monitoring, optical communications, and data processing. The approach has a "self-compensation" feature which is preferred to improve the accuracy of the extracted wavelength or frequency information even though there are components in the system having strong wavelength or frequency dependence in the wide wavelength or frequency range. The method is generic which can be realized in free space, fiber, or photonic integrated circuit (PIC).

14 Claims, 5 Drawing Sheets

(51) Int. Cl.
  *G01J 3/02* (2006.01)
  *G01J 3/28* (2006.01)
  *H04J 14/02* (2006.01)
(58) Field of Classification Search
  USPC ........................................ 250/214 R, 227.23
  See application file for complete search history.

(56) References Cited

OTHER PUBLICATIONS

Wang et al.,"Cubic meter volume optical coherence tomography", Optical Journal, Dec. 15, 2016, pp. 1496-1503; vol. 3, No. 12, Optical Society of America.

\* cited by examiner

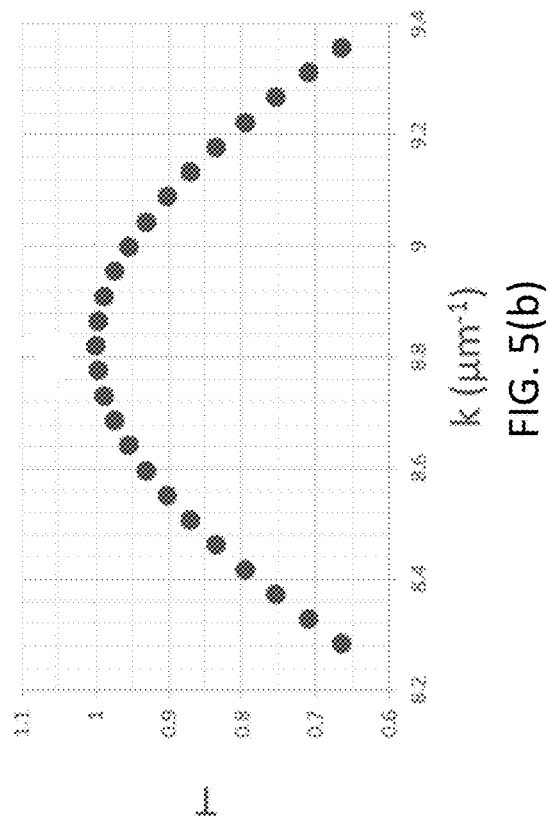
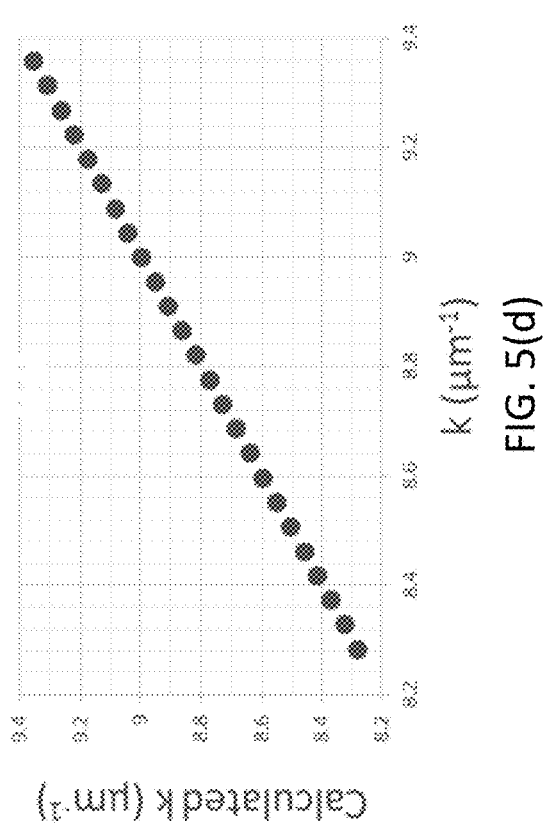
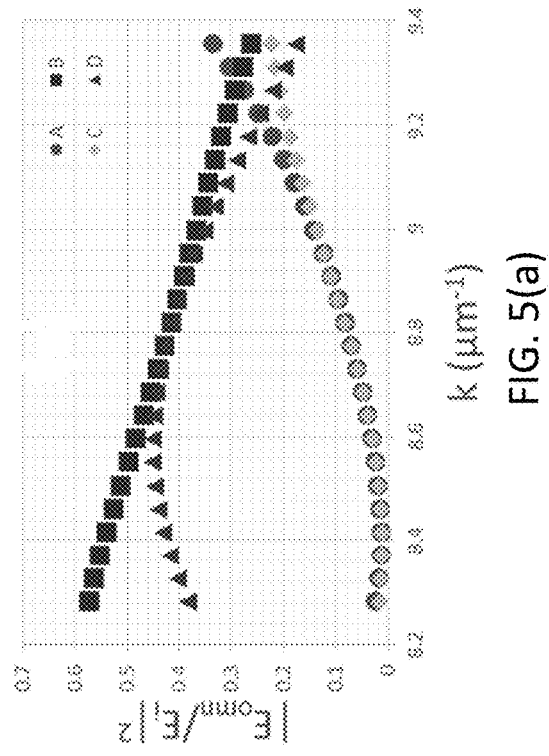
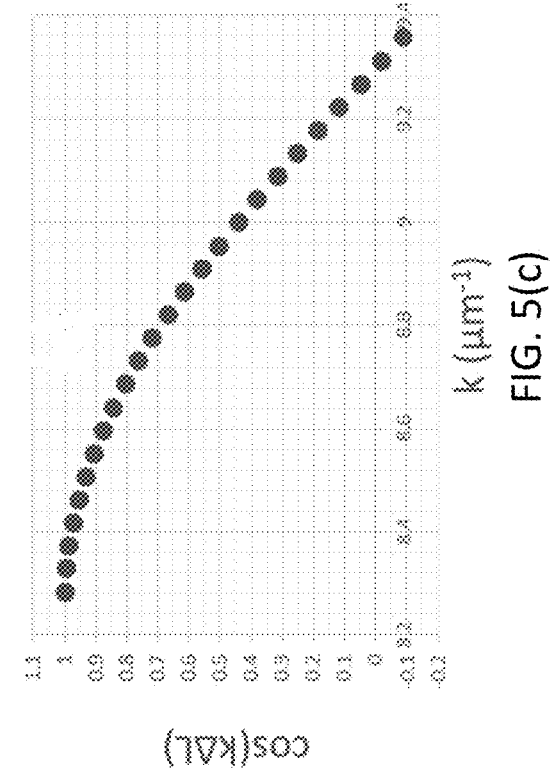
FIG. 5(a)
FIG. 5(b)
FIG. 5(c)
FIG. 5(d)

US 11,353,665 B2

WIDE BANDWIDTH OPTICAL DETECTOR COMPRISING PLURAL PHASE TUNING ELEMENTS RESPECTIVELY RECEIVING OPTICAL SIGNALS FROM DIRECTIONAL COUPLERS

CROSS REFERENCE TO RELATED APPLICATIONS

This application claims the benefit of U.S. Provisional Patent Application No. 62/924,421 filed on Oct. 22, 2019. The contents of U.S. Provisional Patent Application 62/924,421 are hereby incorporated by reference.

FIELD OF THE INVENTION

The present invention relates to optical detectors, and more specifically to a wide bandwidth optical frequency/wavelength detector.

BACKGROUND

Extracting the wavelength/frequency information from optical signals is needed in various applications including but not limited to optical coherence tomography (OCT), wavelength-division multiplexing (WDM) or dense wavelength-division multiplexing (DWDM) in optical communications, and optical data transfer and processing in data center and electronic-photonic integrated circuit.

Commercial available coherent light source for OCT application employs optical trigger based on fiber-Bragg-grating (FBG) to calibrate, control, and monitor the wavelength/frequency information of the wide bandwidth (BW) optical signal (see, for example: THORLABS MEMS-VCSEL Swept-Wavelength Laser Source, 1300 nm, Item No. SL132120). Though FBG has excellent wavelength stability, the quantity of the optical trigger signals is limited by the FBG design or the quantity of the FBG components in the system. It would be ideal to have a component which could resolve the wavelength/frequency information in the full BW of interest.

For WDM and DWDM in optical communications, and optical data transfer and processing in data center and electronic-photonic integrated circuit, optical signals of different wavelength/frequency are launched into single fiber or waveguide simultaneously, processed, and detected at the receiver side, leading to the multiplication of capacity. Therefore, the wavelength/frequency information of the optical signals is crucial for the wavelength selective devices to route the signals from the input ports to the preferred output ports.

Therefore, there is a long-felt need for a method and device to extract wavelength/frequency information from optical signals in the full BW of interest.

SUMMARY

IQ receiver has been used to process the optical data from the sample and the reference arms in OCT (see, for example: Zhao Wang, Benjamin Potsaid, Long Chen, Chris Doerr, Hsiang-Chieh Lee, Torben Nielson, Vijaysekhar Jayaraman, Alex E. Cable, Eric Swanson, and James G. Fujimoto, "Cubic meter volume optical coherence tomography," Optica 3, 1496-1503 (2016)). It features in-phase and quadrature (IQ) dual balanced detection, and is realized by the integration of the optical waveguides, 90-degree phase shifters, waveguide couplers, and etc. In this document, detailed analysis of the detected signals from the IQ receiver reveals their wavelength/frequency dependence, which can be employed to resolve the wavelength/frequency information in the full BW when certain design criteria is followed. However, the accuracy of the exacted wavelength/frequency information can be affected by certain components in the system, due to the fact that their performance has strong wavelength/frequency dependence in the wide range. The issue becomes more prominent when the interested BW is larger (~100 nm for OCT), or the adjacent channels becomes closer (25 GHz/~0.2 nm channel spacing for up to 160 channel operation in DWDM). Therefore, a "self-compensated" design is disclosed according to an embodiment of the present invention to make the detection system robust against the strong wavelength/frequency dependence of those optical components.

An embodiment of the present invention provides an optical detection device, including: a first, second, third, fourth and fifth directional couplers; a first, second, third and fourth phase tuning elements; and a first and second balance detectors; wherein the first directional coupler is configured to receive an input optical signal ($E_i$) and output a first and second optical signals from the first directional coupler ($E_{i12}$, $E_{i21}$); wherein the second directional coupler is configured to receive the first optical signal from the first directional coupler ($E_{i12}$) and output a first and second optical signals from the second directional coupler ($E_{o11'}$, $E_{o12'}$); wherein the third directional coupler is configured to receive the second optical signal from the first directional coupler ($E_{i21}$) and output a first and second optical signals from the third directional coupler ($E_{o21'}$, $E_{o22'}$); wherein the first phase tuning element is configured to receive the first optical signal from the second directional coupler ($E_{o11'}$) and output an optical signal from the first phase tuning element ($E_{o11''}$); wherein the second phase tuning element is configured to receive the second optical signal from the second directional coupler ($E_{o12'}$) and output an optical signal from the second phase tuning element ($E_{o21''}$); wherein the third phase tuning element is configured to receive the first optical signal from the third directional coupler ($E_{o21'}$) and output an optical signal from the third phase tuning element ($E_{o12''}$); wherein the fourth phase tuning element is configured to receive the second optical signal from the third directional coupler ($E_{o22'}$) and output an optical signal from the fourth phase tuning element ($E_{o22''}$); wherein the fourth directional coupler is configured to receive the optical signal from the first phase tuning element ($E_{o11''}$) and the optical signal from the third phase tuning element ($E_{o12''}$) and output a first and second optical signals from the fourth directional coupler ($E_{o11}$, $E_{o12}$); wherein the fifth directional coupler is configured to receive the optical signal from the second phase tuning element ($E_{o21''}$) and the optical signal from the fourth phase tuning element ($E_{o22''}$) and output a first and second optical signals from the fifth directional coupler ($E_{o21}$, $E_{o22}$); wherein the first balance detector is configured to receive the first and second optical signals from the fourth directional coupler ($E_{o11}$, $E_{o12}$) and output a first electrical signal from the first balance detector; and wherein the second balance detector is configured to receive the first and second optical signals from the fifth directional coupler ($E_{o21}$, $E_{o22}$) and output a second electrical signal from the second balance detector.

An embodiment of the present invention provides an optical detection device, including: a first, second, third, fourth and fifth directional couplers; a first, second, third and fourth phase tuning elements; and a first, second, third and fourth photodetectors; wherein the first directional coupler is configured to receive an input optical signal ($E_i$) and output a first and second optical signals from the first directional coupler ($E_{i12}$, $E_{i12}$); wherein the second directional coupler is configured to receive the first optical signal from the first directional coupler ($E_{i12}$) and output a first and second optical signals from the second directional coupler ($E_{o11'}$, $E_{o12'}$); wherein the third directional coupler is configured to receive the second optical signal from the first directional coupler ($E_{i21}$) and output a first and second optical signals from the third directional coupler ($E_{o21'}$, $E_{o22'}$); wherein the first phase tuning element is configured to receive the first optical signal from the second directional coupler ($E_{o11'}$) and output an optical signal the first phase tuning element ($E_{o11''}$); wherein the second phase tuning element is configured to receive the second optical signal from the second directional coupler ($E_{o12'}$) and output an optical signal from the second phase tuning element ($E_{o12''}$); wherein the third phase tuning element is configured to receive the first optical signal from the third directional coupler ($E_{o21'}$) and output an optical signal from the third phase tuning element ($E_{o21''}$); wherein the fourth phase tuning element is configured to receive the second optical signal from the third directional coupler ($E_{o22'}$) and output an optical signal from the fourth phase tuning element ($E_{o22''}$); wherein the fourth directional coupler is configured to receive the optical signal from the first phase tuning element ($E_{o11''}$) and the optical signal from the second phase tuning element ($E_{o12''}$) and output a first and second optical signals from the fourth directional coupler ($E_{o11}$, $E_{o12}$); wherein the fifth directional coupler is configured to receive the optical signal from the third phase tuning element ($E_{o21''}$) and the optical signal from the fourth phase tuning element ($E_{o22''}$) and output a first and second optical signals from the fifth directional coupler ($E_{o21}$, $E_{o22}$); wherein the first photodetector is configured to receive the first optical signal from the fourth directional coupler ($E_{o11}$) and output a first electrical signal from the first photodetector; wherein the second photodetector is configured to receive the second optical signal from the fourth directional coupler ($E_{o12}$) and output a second electrical signal from the second photodetector; wherein the third photodetector is configured to receive the first optical signal from the fifth directional coupler ($E_{o21}$) and output a third electrical signal from the third photodetector; and wherein the fourth photodetector is configured to receive the second optical signal from the fifth directional coupler ($E_{o22}$) and output a fourth electrical signal from the fourth photodetector.

An embodiment of the present invention provides a method of detecting an optical signal, including: receiving, by a first directional coupler, an input optical signal ($E_i$), and outputting a first and second optical signals from the first directional coupler ($E_{i12}$, $E_{i21}$); receiving, by a second directional coupler, the first optical signal from the first directional coupler ($E_{i12}$), and outputting a first and second optical signals from the second directional coupler ($E_{o11'}$, $E_{o12'}$); receiving, by a third directional coupler, the second optical signal from the first directional coupler ($E_{i21}$), and outputting a first and second optical signals from the third directional coupler ($E_{o21'}$, $E_{o22'}$); receiving, by a first phase tuning element, the first optical signal from the second directional coupler ($E_{o11'}$), and outputting an optical signal from the first phase tuning element ($E_{o11''}$); receiving, by a second phase tuning element, the second optical signal from the second directional coupler ($E_{o12'}$), and outputting an optical signal from the second phase tuning element ($E_{o21''}$); receiving, by a third phase tuning element, the first optical signal from the third directional coupler ($E_{o21'}$), and outputting an optical signal from the third phase tuning element ($E_{o12''}$); receiving, by a fourth phase tuning element, the second optical signal from the third directional coupler ($E_{o22'}$), and outputting an optical signal from the fourth phase tuning element ($E_{o22''}$); receiving, by a fourth directional coupler, the optical signal from the first phase tuning element ($E_{o11''}$) and the optical signal from the third phase tuning element ($E_{o12''}$), and outputting a first and second optical signals from the fourth directional coupler ($E_{o11}$, $E_{o12}$); receiving, by a fifth directional coupler, the optical signal from the second phase tuning element ($E_{o21''}$) and the optical signal from the fourth phase tuning element ($E_{o22''}$), and outputting a first and second optical signals from the fifth directional coupler, ($E_{o21}$, $E_{o22}$); receiving, by a first balance detector, the first and second optical signals from the fourth directional coupler ($E_{o11}$, $E_{o12}$), and outputting a first electrical signal from the first balance detector; and receiving, by a second balance detector, the first and second optical signals from the fifth directional coupler ($E_{o21}$, $E_{o22}$), and outputting a second electrical signal from the second balance detector.

An embodiment of the present invention provides a method of detecting an optical signal, including: receiving, by a first directional coupler, an input optical signal ($E_i$), and outputting a first and second optical signals from the first directional coupler ($E_{i12}$, $E_{i21}$); receiving, by a second directional coupler, the first optical signal from the first directional coupler ($E_{i12}$), and outputting a first and second optical signals from the second directional coupler ($E_{o11'}$, $E_{o12'}$); receiving, by a third directional coupler, the second optical signal from the first directional coupler ($E_{i21}$), and outputting a first and second optical signals from the third directional coupler ($E_{o21'}$, $E_{o22'}$); receiving, by a first phase tuning element, the first optical signal from the second directional coupler ($E_{o11'}$), and outputting an optical signal from the first phase tuning element ($E_{o11''}$); receiving, by a second phase tuning element, the second optical signal from the second directional coupler ($E_{o12'}$), and outputting an optical signal from the second phase tuning element ($E_{o12''}$); receiving, by a third phase tuning element, the first optical signal from the third directional coupler ($E_{o21'}$), and outputting an optical signal from the third phase tuning element ($E_{o21''}$); receiving, by a fourth phase tuning element, the second optical signal from the third directional coupler ($E_{o22'}$), and outputting an optical signal from the fourth phase tuning element ($E_{o22''}$); receiving, by a fourth directional coupler, the optical signal from the first phase tuning element ($E_{o11''}$) and the optical signal from the second phase tuning element ($E_{o12''}$), and outputting a first and second optical signals from the fourth directional coupler ($E_{o11}$, $E_{o12}$); receiving, by a fifth directional coupler, the optical signal from the third phase tuning element ($E_{o21''}$) and the optical signal from the fourth phase tuning element ($E_{o22''}$), and outputting a first and second optical signals from the fifth directional coupler, ($E_{o21}$, $E_{o22}$); receiving, by a first photodetector, the first optical signal from the fourth directional coupler ($E_{o11}$), and outputting a first electrical signal from the first photodetector; receiving, by a second photodetector, the second optical signal from the fourth directional coupler ($E_{o12}$), and outputting a second electrical signal from the second photodetector; receiving, by a third photodetector, the first optical signal from the fifth directional coupler (Eon), and outputting a third electrical signal from the third photodetector; and receiving, by a fourth photodetector, the second optical signal from the fifth directional coupler ($E_{o22}$), and outputting a fourth electrical signal from the fourth photodetector.

BRIEF DESCRIPTION OF THE DRAWINGS

FIG. 2(a): Calculated output optical powers from DC 4 and DC 5, i.e., A, B, C, and D in Table 2, all of which are normalized against the input optical power $|E_i|^2$. FIG. 2(b): Calculated I/Q signals which can be directly measured by the two balanced detectors in practice (I=A−B, Q=C−D). FIG. 2(c): Plot of (A−B)/(C−D), which equals tan (k$\Delta$L). FIG. 2(d): The calculated k vs. the actual k values, showing no discrepancy between the two.

FIG. 3(a): Calculated output optical powers from DC 4 and DC 5, i.e., A, B, C, and D in Table 2, all of which are normalized against the input optical power $|E_i|^2$. FIG. 3(b): Calculated FQ signals which can be directly measured by the two balanced detectors in practice (I=A−B, Q=C−D). FIG. 3(c): Plot of (A−B)/(C−D), which equals tan (k$\Delta$L). FIG. 3(d) The calculated k vs. the actual k values. FIG. 3(e): The discrepancy between the calculated k and the actual k values as a function of k.

FIGS. 5(a)-(d) illustrate a practical situation of the self-compensated wavelength solver according to an embodiment. FIG. 5(a): Calculated output optical powers A, B, C, and D in Table 4, all of which are normalized by the input optical power $|E_i|^2$. FIG. 5(b): Wavelength/frequency dependence of T=$\tan^2(\kappa L)$, showing the splitting ratio equals to 50/50 at central wavelength and gradually changes to 60/40 at edges of the range for all the five DCs. FIG. 5(c): Plot of cos(k$\Delta$L). FIG. 5(d): The calculated k vs. the actual k values by Equation (2). It has been realized that there is no discrepancy between the two in the whole BW of interest.

DETAILED DESCRIPTION OF THE PREFERRED EMBODIMENTS

Figure 1:
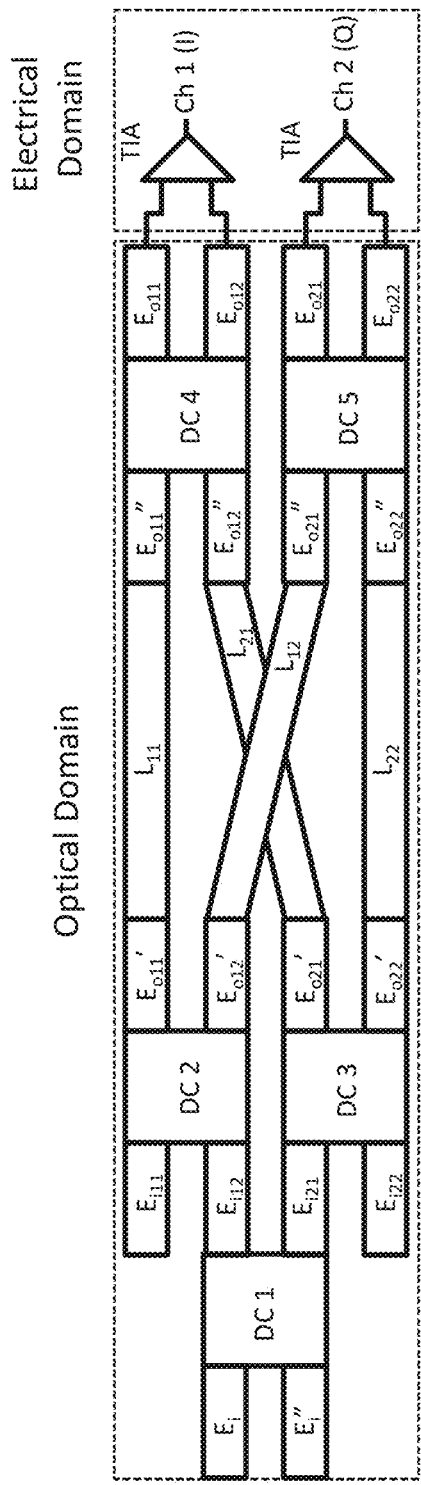
FIG. 1 is a schematic diagram of a wavelength solver based on IQ receiver type of design and without self-compensation feature according to an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Wavelength Solver Based on IQ Receiver Type of Design and without Self-Compensation Feature A schematic diagram of an IQ receiver type of design is shown in FIG. 1. A light source of optical field $E_i$ is launched into the directional coupler 1 (DC 1), and the two outputs of the DC 1 having optical field $E_{i12}$ and $E_{i21}$ serve as the inputs of the directional couplers 2 (DC 2) and 3 (DC 3) respectively. The four outputs of the DC 2 and DC 3, which are of optical field $E_{o11}'$, $E_{o12}'$, $E_{o21}'$, and $E_{o22}'$, then pass through four separate phase tuning elements, which have lengths of $L_{11}$, $L_{12}$, $L_{21}$, and $L_{22}$ respectively. Phase tuning element of length $L_{22}$ has an optical phase tunability of at least $\pi/2$. The two outputs of the two phase tuning elements of lengths $L_{11}$ and $L_{21}$, which are of optical field $E_{o11}''$ and $E_{o12}''$, are then launched into the two inputs of the directional coupler 4 (DC 4). And the two outputs of the two phase tuning elements of lengths $L_{12}$ and $L_{22}$, which are of optical field $E_{o21}''$ and $E_{o22}''$, are then launched into the two inputs of the directional coupler 5 (DC 5). The four outputs of the DC 4 and DC 5, which are of optical field $E_{o11}$, $E_{o12}$, $E_{o21}$, and $E_{o22}$, then get detected by two balanced detectors. In one embodiment, all five directional couplers from DC 1 to DC 5 are with nominal splitting ratio of 50/50 in the wavelength/frequency range of interest. In one embodiment, all phase tuning elements include a waveguide (WG) and a heater.

It is assumed that there is no additional loss and no wavelength/frequency dependence from the crossing area of the two phase tuning elements of lengths $L_{12}$ and $L_{21}$. The phase delay of the phase tuning element of length $L_{22}$ is constant at $\pi/2$ in the BW of interest. Based on the coupled mode theory (R. R. A. Syms and J. R. Cozens, "Optical Guided Waves and Devices," McGraw-Hill, 1992), and the propagation of the electromagnetic waves, the expressions of the optical fields mentioned above are listed in Table 1 in terms of the input optical field $E_i$, where k is the propagation constant, z is the distance along the propagation direction, $\kappa$ is the coupling coefficient of the DC, and L is the coupling length of the DC.

TABLE 1

Optical Field and Their Expression $E_{i12} = E_i \cos(\kappa L) e^{-ikz}$ $E_{i21} = -iE_i \sin(\kappa L) e^{-ikz}$ $E_{o12}' = E_i \cos(\kappa L) \cos(\kappa L) e^{-ikz}$ $E_{o11}' = -iE_i \cos(\kappa L) \sin(\kappa L) e^{-ikz}$ $E_{o21}' = -iE_i \sin(\kappa L) \cos(\kappa L) e^{-ikz}$ $E_{o22}' = -E_i \sin(\kappa L) \sin(\kappa L) e^{-ikz}$ $E_{o12}'' = -iE_i \sin(\kappa L) \cos(\kappa L) e^{-ikL_{21}}$ $E_{o11}'' = E_i \cos(\kappa L) \sin(\kappa L) e^{-ikL_{11} - i\frac{\pi}{2}}$ $E_{o21}'' = E_i \cos(\kappa L) \cos(\kappa L) e^{-ikL_{12}}$ $E_{o22}'' = E_i \sin(\kappa L) \sin(\kappa L) e^{-ikL_{22} - i\pi - i\frac{\pi}{2}}$ $E_{o12} = E_i \sin(\kappa L) \cos(\kappa L) e^{-ikL_{11}} \left[ e^{-ik(L_{21}-L_{11}) - i\frac{\pi}{2}} \cos(\kappa L) - \sin(\kappa L) \right]$ $E_{o11} = -iE_i \cos(\kappa L) \sin(\kappa L) e^{-ikL_{11}} \left[ \cos(\kappa L) + e^{-ik(L_{21}-L_{11}) - i\frac{\pi}{2}} \sin(\kappa L) \right]$ $E_{o21} = E_i e^{-ikL_{12}} \left[ \cos(\kappa L)\cos(\kappa L)\cos(\kappa L) - \sin(\kappa L)\sin(\kappa L)\sin(\kappa L) e^{-ik(L_{22}-L_{12}) - i\frac{\pi}{2} - i\frac{\pi}{2}} \right]$ $E_{o22} = E_i \sin(\kappa L) \cos(\kappa L) e^{-ikL_{12}} \left[ \sin(\kappa L) e^{-ik(L_{22}-L_{12}) - i\pi - i\frac{\pi}{2}} + \cos(\kappa L) e^{-i\frac{\pi}{2}} \right]$ Table 1 could lead to the expressions of the four optical powers which get detected by the two balanced detectors, by using $|E_{omn}|^2 = E_{omn} E^*_{omn}$ (m, n=1, 2), which are listed in Table 2, where $\Delta L_1 = L_{21} - L_{11}$ and $\Delta L_2 = L_{22} - L_{12}$.

TABLE 2

Normalized Optical Power and Their Expression $A = |E_{o12}|^2/|E_i|^2 = \cos^4(\kappa L) \sin^2(\kappa L) [1 + \tan^2(\kappa L) + \tan(\kappa L) 2 \sin(k\Delta L_1)]$ $B = |E_{o11}|^2/|E_i|^2 = \cos^4(\kappa L) \sin^2(\kappa L) [1 + \tan^2(\kappa L) - \tan(\kappa L) 2 \sin(k\Delta L_1)]$ $C = |E_{o21}|^2/|E_i|^2 = \cos^6(\kappa L) [1 + \tan^6(\kappa L) + \tan^3(\kappa L) 2 \cos(k\Delta L_2)]$ $D = |E_{o22}|^2/|E_i|^2 = \cos^4(\kappa L) \sin^2(\kappa L) [1 + \tan^2(\kappa L) - \tan(\kappa L) 2 \cos(k\Delta L_2)]$ Thus, the normalized optical signals detected by the two balanced detectors are:

Ch 1(I): $A - B = \cos^4(\kappa L)\sin^2(\kappa L)\tan(\kappa L)4\sin(k\Delta L_1)$ Ch 2(Q): $C - D = \cos^4(\kappa L)\sin^2(\kappa L)\tan(\kappa L)\{E + 4\cos(k\Delta L_2)\}$ where $E = \dfrac{(1 + \tan^2(\kappa L))(1 + \tan(\kappa L))^2 (1 - \tan(\kappa L))^2}{\tan^3(\kappa L)}$.

If: (1) all the five DCs have constant 50/50 splitting ratio in the BW of interest; (2) the phase delay of the phase tuning element of length $L_{22}$ is constant at $\pi/2$ in the BW of interest; (3) there is no additional loss and no wavelength/frequency dependence in the crossing area of the two phase tuning elements of lengths $L_{12}$ and $L_{21}$; and (4) $\Delta L = \Delta L_1 = \Delta L_2$, then $\tan(\kappa L)=1$, $E=0$, and $$\tan(k\Delta L) = \frac{A-B}{C-D}.$$

Thus, the exacted wavelength/frequency is:

$$k = \frac{1}{\Delta L}\left[\arctan\left(\frac{A-B}{C-D}\right) + p\pi\right] \quad \text{Eq. (1)}$$

where $p$ = integer, and $$\frac{1}{\pi}\left[k_1 \Delta L - \arctan\left(\frac{A-B}{C-D}\right)\right] \leq p \leq \frac{1}{\pi}\left[k_2 \Delta L - \arctan\left(\frac{A-B}{C-D}\right)\right],$$

and $k_1$ and $k_2$ are the lower and higher limits of the propagation constant of the BW of interest.

In order to demonstrate how Equation (1) can be employed to extract the wavelength/frequency information and the limitation of the IQ receiver type of design, Example 1 will be discussed next, which is based on a PIC material system with known effective index and propagation constant as functions of wavelength, and a specially chosen $\Delta L$.

Figure 2A:
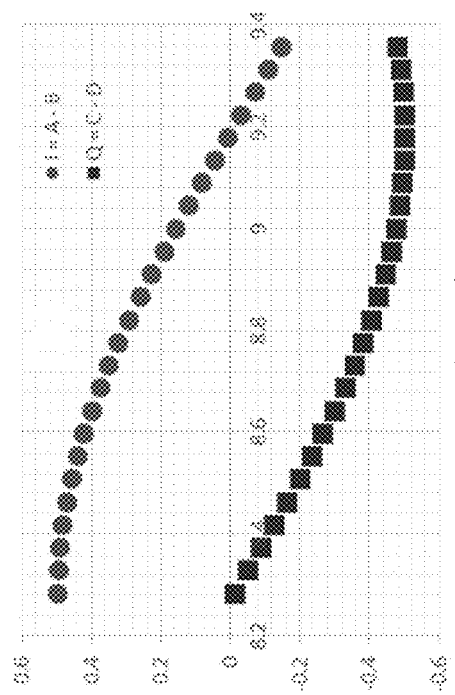
FIGS. 2(a)-(d) illustrate an ideal situation of a wavelength solver based on an IQ receiver type of design (without self-compensation feature, and constant 50/50 splitting ratio for all the five DCs) according to an embodiment.
Figure 2B:
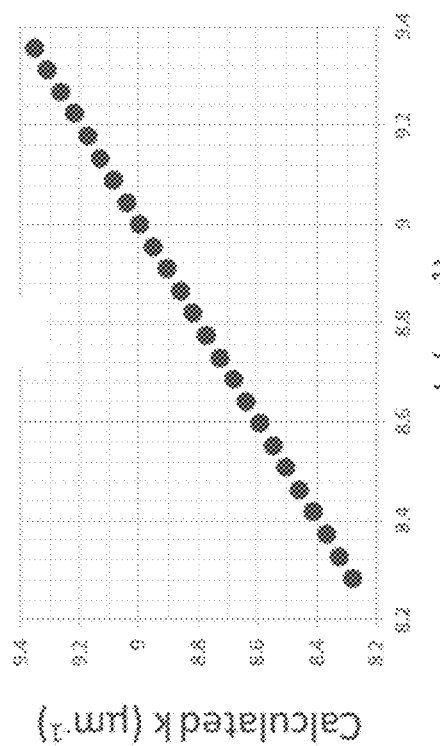
Figure 2C:
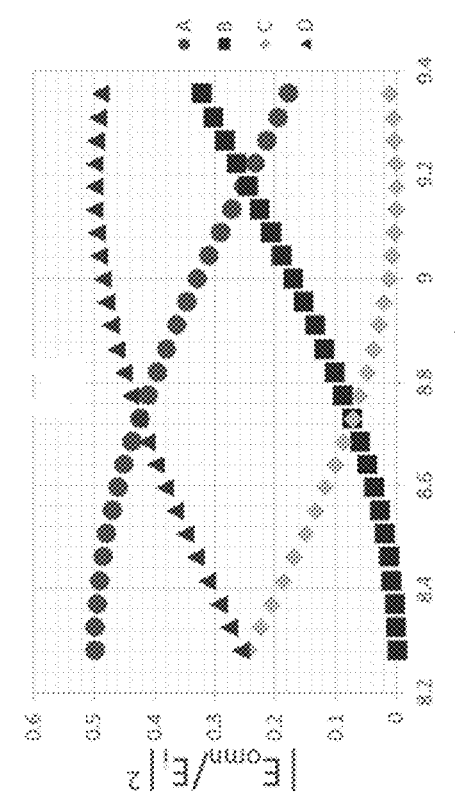
Figure 2D:
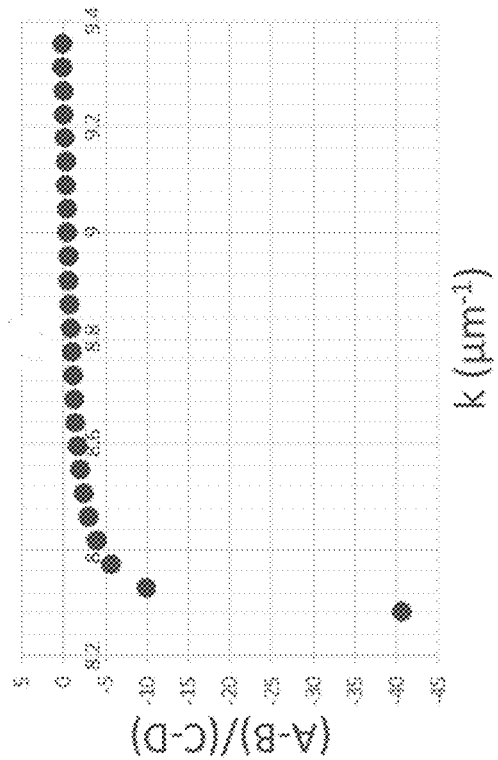

Example 1: Wavelength Solver Based on IQ Receiver Type of Design and without Self-Compensation Feature The results in FIG. 2 are based on the above assumptions, especially the constant 50/50 splitting ratio for all the five DCs, i.e., $\tan(\kappa L)=1$. And FIG. 2 covers a wavelength range of interest of 120 nm. FIG. 2(a) shows the calculated output optical powers from DC 4 and DC 5 in FIG. 1 using Table 2, i.e., A, B, C, and D, all of which are normalized against the input optical power $|E_i|^2$. As expected, the sum of the four optical powers equals one at a given propagation constant k. FIG. 2(b) are the calculated I/Q signals which can be directly measured by the two balanced detectors in practice. FIG. 2(c) shows the plot of $$\frac{A-B}{C-D},$$

which equals tan(kΔL). And FIG. 2(d) plots the calculated k against the actual k values by using Equation (1) in which p has been determined to be 5. Therefore, complete retrieval of the k values can be realized in the full BW of interest, which is the desired wavelength/frequency information.

In reality, due to the wavelength/frequency dispersion of the material system's effective index, the assumption of the constant 50/50 splitting ratio cannot hold any more. For instance, the splitting ratio can be designed at 50/50 in the center of the wavelength/frequency range, but it may deviate from 50/50 to 60/40 when approaching the edges of the range. In this situation, the extracted k values by Equation (1) will show prominent deviation from the actual k values, and the discrepancy will become larger when the splitting ratio of the DCs deviates more from 50/50, which has been illustrated in FIG. 3. When comparing FIG. 2 and FIG. 3, though there is no prominent difference in plots (a) and (b), plots (c) and (d) show noticeable difference, especially at the lower limit of k. The discrepancy is more clearly illustrated in FIG. 3(e), the difference between the calculated k and the actual k values.

Thus, a more robust design for the wavelength solver is preferred to remove the above wavelength-dependent discrepancy.

Self-Compensated Wavelength Solver

Figure 4:
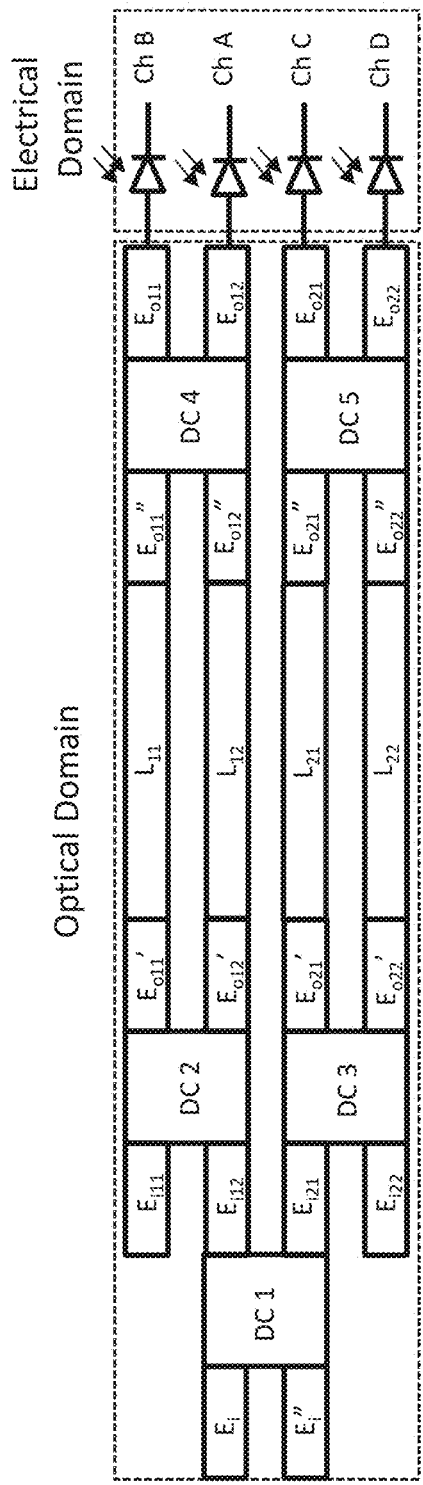
FIG. 4 is a schematic diagram of a self-compensated wavelength solver according to an embodiment.

A schematic diagram of the self-compensated wavelength solver is shown in FIG. 4. A light source of optical field E is launched into the directional coupler 1 (DC 1), and the two outputs of the DC 1 having optical field $E_{i12}$ and $E_{i21}$ serve as the inputs of the directional couplers 2 (DC 2) and 3 (DC 3) respectively. The four outputs of the DC 2 and DC 3, which are of optical field $E_{o11}'$, $E_{o12}'$, $E_{o21}'$, and $E_{o22}'$, then pass through four separate phase tuning elements, which have lengths of $L_{11}$, $L_{12}$, $L_{21}$, and $L_{22}$ respectively. The two outputs of the two phase tuning elements of lengths $L_{11}$ and $L_{12}$, which are of optical field $E_{o11}''$ and $E_{o12}''$, are then launched into the two inputs of the directional coupler 4 (DC 4). And the two outputs of the two phase tuning elements of lengths $L_{21}$ and $L_{22}$, which are of optical field $E_{o21}''$ and $E_{o22}''$, are then launched into the two inputs of the directional coupler 5 (DC 5). The four outputs of the DC 4 and DC 5, which are of optical field $E_{o11}$, $E_{o12}$, $E_{o21}$, and $E_{o22}$, then get detected by four photodetectors. In one embodiment, all five directional couplers from DC 1 to DC 5 are with nominal splitting ratio of 50/50 in the wavelength/frequency range of interest. In one embodiment, all phase tuning elements include a waveguide (WG) and a heater.

The self-compensated wavelength solver in FIG. 4 has a simpler structure than the IQ receiver type of design in FIG. 1. First, it has no crossing area of the two phase tuning elements of lengths $L_{12}$ and $L_{21}$, and thus related loss and wavelength/frequency dependence. Second, there is no strict requirement on the π/2 phase delay for the phase tuning element of length $L_{22}$ in the BW of interest. Based on the coupled mode theory and the propagation of the electromagnetic waves, the expressions of the optical fields mentioned above are listed in Table 3 in terms of the input optical field $E_i$, where κ is the propagation constant, z is the distance along the propagation direction, κ is the coupling coefficient of the DC, and L is the coupling length of the DC.

TABLE 3

Optical Field and Their Expression of the Self-compensated Wavelength Solver $E_{i12} = E_i \cos(\kappa L) \, e^{-ikz}$
$E_{i21} = -iE_i \sin(\kappa L) \, e^{-ikz}$
$E_{o12}' = E_i \cos(\kappa L) \cos(\kappa L) \, e^{-ikz}$
$E_{o11}' = -iE_i \cos(\kappa L) \sin(\kappa L) \, e^{-ikz}$
$E_{o21}' = -iE_i \sin(\kappa L) \cos(\kappa L) \, e^{-ikz}$
$E_{o22}' = -E_i \sin(\kappa L) \sin(\kappa L) \, e^{-ikz}$
$E_{o12}'' = E_i \cos(\kappa L) \cos(\kappa L) \, e^{-ikL_{12}}$ $E_{o11}'' = E_i \cos(\kappa L)\sin(\kappa L)e^{-ikL_{11}-i\frac{\pi}{2}}$ $E_{o21}'' = E_i \sin(\kappa L)\cos(\kappa L)e^{-ikL_{21}-i\frac{\pi}{2}}$ $E_{o22}'' = E_i \sin(\kappa L) \sin(\kappa L) \, e^{-ikL_{22}-i\pi}$
$E_{o12} = E_i \cos(\kappa L) \, e^{-ikL_{11}} [\cos(\kappa L) \cos(\kappa L) \, e^{-ik(L_{12}-L_{11})} - \sin(\kappa L) \sin(\kappa L)]$
$E_{o11} = -iE_i \cos(\kappa L) \sin(\kappa L) \, e^{-ikL_{11}} [1 + e^{-ik(L_{12}-L_{11})}]$
$E_{o21} = -iE_i \sin(\kappa L) \cos(\kappa L) \, e^{-ikL_{21}} [\cos(\kappa L) \cos(\kappa L) - \sin(\kappa L) \sin(\kappa L) \, e^{-ik(L_{22}-L_{21})}]$
$E_{o22} = -E_i \sin(\kappa L) \sin(\kappa L) \cos(\kappa L) \, e^{-ikL_{21}}[1 + e^{-ik(L_{22}-L_{21})}]$ Table 3 could lead to the expressions of the four optical powers which get detected by the four photodetectors, by using $|E_{omn}|^2 = E_{omn}E^*_{omn}$ (m, n=1, 2), which are listed in Table 4, where $\Delta L_1 = L_{12}-L_{11}$, $\Delta L_2 = L_{22}-L_{21}$, and T=tan²(κL).

TABLE 4

Normalized Optical Power and Their Expression of the Self-compensated Wavelength Solver $A = |E_{o12}|^2/|E_i|^2 = \cos^6(\kappa L) (1 + T^2 - 2T \cos(k\Delta L_1))$
$B = |E_{o11}|^2/|E_i|^2 = \cos^4(\kappa L) \sin^2(\kappa L) \, 2(1 + \cos(k\Delta L_1))$
$C = |E_{o21}|^2/|E_i|^2 = \sin^2(\kappa L) \cos^4(\kappa L) (1 + T^2 - 2T \cos(k\Delta L_2))$
$D = |E_{o22}|^2/|E_i|^2 = \cos^2(\kappa L) \sin^4(\kappa L) \, 2(1 + \cos(k\Delta L_2))$ If $\Delta L = \Delta L_1 = \Delta L_2$, then $$T = \tan^2(\kappa L) = \frac{D}{B} = \frac{C}{A}, \text{ and}$$

$$\cos(k\Delta L) = \frac{\frac{(1+T)^2}{2T}}{1 + \frac{A}{B}} - 1.$$

Thus, the exacted wavelength/frequency is:

$$k = \frac{1}{\Delta L}\left[\arccos\left(\frac{\frac{(1+T)^2}{2T}}{1 + \frac{A}{B}} - 1\right) + 2q\pi\right]$$

where $q$ = integer, and $$\frac{1}{2\pi}\left[k_1\Delta L - \arccos\left(\frac{\frac{(1+T)^2}{2T}}{1 + \frac{A}{B}} - 1\right)\right] \leq$$

$$q \leq \frac{1}{2\pi}\left[k_2\Delta L - \arccos\left(\frac{\frac{(1+T)^2}{2T}}{1 + \frac{A}{B}} - 1\right)\right],$$

and $k_1$ and $k_2$ are the lower and higher limits of the propagation constant of the BW of interest.

It should be noted that most assumptions for Equation (1) are not necessary for Equation (2), especially the constant 50/50 splitting ratio for all the DCs, the constant $\pi/2$ phase delay of the phase tuning element of length $L_{22}$, and the crossing area of the two phase tuning elements of lengths $L_{12}$ and $L_{21}$. Therefore, the self-compensated wavelength solver in FIG. 4 is not only simpler in structure than the IQ receiver type of design, but also more tolerant in optical components' performance.

Example 2 will be discussed next, which is based on the same PIC material system as Example 1 with known effective index and propagation constant as functions of wavelength, and a specially chosen $\Delta L$.

Example 2: Self-Compensated Wavelength Solver

FIG. 5 shows the calculated results of the self-compensated wavelength solver, and the wavelength/frequency dependence of the splitting ratio of the DCs are taken into account. Using the equations in Table 4, the four detected signals are calculated and plotted in FIG. 5(a), which are normalized by the input optical power $|E_i|^2$, i.e., A, B, C and D. FIG. 5(b) illustrates the wavelength/frequency dependence of the splitting ratio of the DCs, in which $T=\tan^2(\kappa L)=1$ at central wavelength/frequency, corresponding to a 50/50 splitting ratio. In this case, T deviates from unity away from the center wavelength and the splitting ratio equals to 60/40 at both edges. FIG. 5(c) is the calculated $\cos(k\Delta L)$ from the four signals in FIG. 5(a). FIG. 5(d) shows the calculated k values vs. the actual k in which q has been determined to be 2 by Equation (2), and no discrepancy between the two has been found in the whole range. Therefore, the wavelength/frequency information in the full BW of interest can be extracted through the self-compensated wavelength solver.

Calibration of the Wavelength Solver System

Figure 3A:
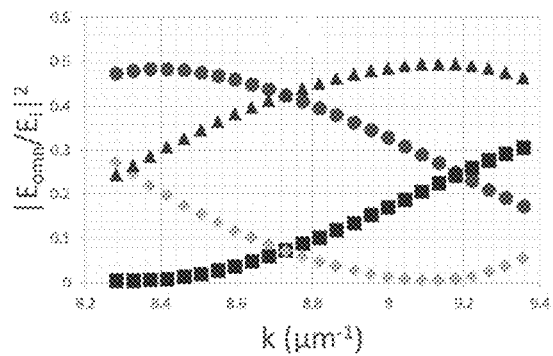
FIGS. 3(a)-(e) illustrate situation of the wavelength solver based on the IQ receiver type of design (without self-compensation feature, and splitting ratio equals to 50/50 at central wavelength and gradually changes to 60/40 at edges of the BW of interest for all the five DCs) according to an embodiment.
Figure 3B:
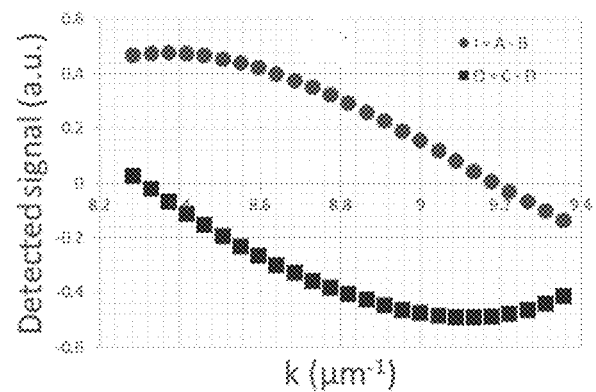
Figure 3C:
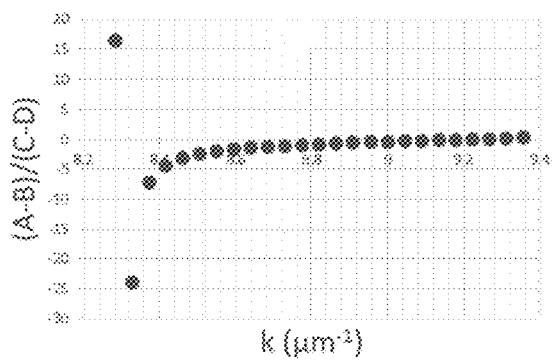
Figure 3D:
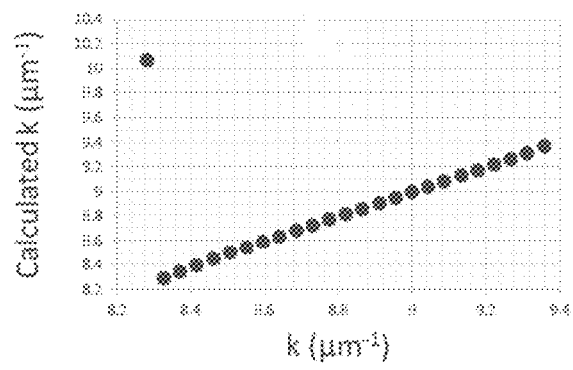
Figure 3E:
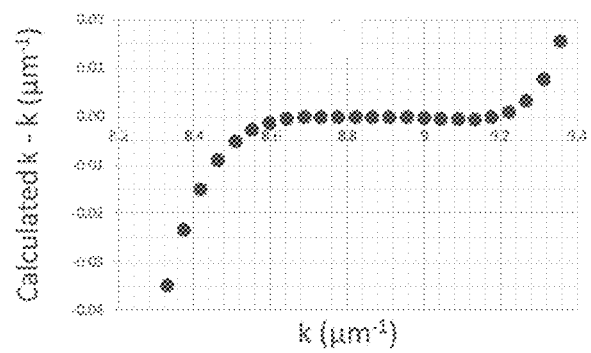

For both types of the wavelength solvers, i.e., IQ receiver type (without self-compensation feature) and the self-compensated one, Equations (1) and (2) show how the wavelength/frequency can be calculated. And FIG. 3(b) and FIG. 5(a) illustrate the dependence of the detected signals on the wavelength/frequency which contains the shape information of the spectra, i.e., I(k), Q(k) and A(k), B(k), C(k), D(k). In practice, external light sources of known wavelengths/frequencies $(k_{j,real})$ (j=integer) can be employed to calibrate the wavelength solver system. For instance, an external light source $(k_{1,real})$ can be launched into the wavelength solver system at the input port with electrical field $E_i$ in FIG. 1 and FIG. 4, and the corresponding signals $I(k_{1,real})$, $Q(k_{1,real})$ and $A(k_{1,real})$, $B(k_{1,real})$, $C(k_{1,real})$, $D(k_{1,real})$ can be measured from the output ports. Then the calculated wavelength/frequency $(k_{1,test})$ by Equations (1) and (2) can be compared and verified by the known wavelength/frequency $(k_{1,real})$. If they match within the accuracy requirement, the calibration process is done. If not, the phase tuning elements in FIG. 1 and FIG. 4 need to be adjusted until they match. This calibration process can be performed by one (j=1) or more than one (j=integer, j>1) external light sources.

While the present invention has been described at some length and with some particularity with respect to the several described embodiments, it is not intended that it should be limited to any such particulars or embodiments or any particular embodiment, but it is to be construed so as to provide the broadest possible interpretation in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. An optical detection device, comprising:
   a first, second, third, fourth and fifth directional couplers;
   a first, second, third and fourth phase tuning elements; and
   a first and second balance detectors;
   wherein the first directional coupler is configured to receive an input optical signal ($E_i$) and output a first and second optical signals from the first directional coupler ($E_{i12}$, $E_{i21}$);
   wherein the second directional coupler is configured to receive the first optical signal from the first directional coupler ($E_{i12}$) and output a first and second optical signals from the second directional coupler ($E_{o11'}$, $E_{o12'}$);
   wherein the third directional coupler is configured to receive the second optical signal from the first directional coupler ($E_{i12}$) and output a first and second optical signals from the third directional coupler ($E_{o21'}$, $E_{o22'}$);
   wherein the first phase tuning element is configured to receive the first optical signal from the second directional coupler ($E_{o11'}$) and output an optical signal from the first phase tuning element ($E_{o11''}$);
   wherein the second phase tuning element is configured to receive the second optical signal from the second directional coupler ($E_{o12'}$) and output an optical signal from the second phase tuning element ($E_{o21''}$);
   wherein the third phase tuning element is configured to receive the first optical signal from the third directional coupler ($E_{o21'}$) and output an optical signal from the third phase tuning element ($E_{o12''}$);
   wherein the fourth phase tuning element is configured to receive the second optical signal from the third directional coupler ($E_{o22'}$) and output an optical signal from the fourth phase tuning element ($E_{o22''}$);
   wherein the fourth directional coupler is configured to receive the optical signal from the first phase tuning element ($E_{o11''}$) and the optical signal from the third phase tuning element ($E_{o12''}$) and output a first and second optical signals from the fourth directional coupler ($E_{o11}$, $E_{o12}$);
   wherein the fifth directional coupler is configured to receive the optical signal from the second phase tuning element ($E_{o21''}$) and the optical signal from the fourth phase tuning element ($E_{o22''}$) and output a first and second optical signals from the fifth directional coupler ($E_{o21}$, $E_{o22}$);
   wherein the first balance detector is configured to receive the first and second optical signals from the fourth directional coupler ($E_{o11}$, $E_{o12}$) and output a first electrical signal from the first balance detector; and
   wherein the second balance detector is configured to receive the first and second optical signals from the fifth directional coupler ($E_{o21}$, $E_{o22}$) and output a second electrical signal from the second balance detector.

2. The device of claim 1, further comprising a processor configured to determine a wavelength or frequency of the input optical signal based on the first and second electrical signals from the first and second balance detectors respectively.

3. The device of claim 1, wherein the first, second, third, fourth and fifth directional couplers are 50/50 couplers.

4. The device of claim 1, wherein the fourth phase tuning element is tunable for over at least $\pi/2$ range.

5. An optical detection device, comprising:
a first, second, third, fourth and fifth directional couplers;
a first, second, third and fourth phase tuning elements; and
a first, second, third and fourth photodetectors;
wherein the first directional coupler is configured to receive an input optical signal ($E_i$) and output a first and second optical signals from the first directional coupler ($E_{i12}$, $E_{i21}$);
wherein the second directional coupler is configured to receive the first optical signal from the first directional coupler ($E_{i12}$) and output a first and second optical signals from the second directional coupler ($E_{o11'}$, $E_{o12'}$);
wherein the third directional coupler is configured to receive the second optical signal from the first directional coupler ($E_{i21}$) and output a first and second optical signals from the third directional coupler ($E_{o21'}$, $E_{o22'}$);
wherein the first phase tuning element is configured to receive the first optical signal from the second directional coupler ($E_{o11'}$) and output an optical signal the first phase tuning element ($E_{o11''}$);
wherein the second phase tuning element is configured to receive the second optical signal from the second directional coupler ($E_{o12'}$) and output an optical signal from the second phase tuning element ($E_{o12''}$);
wherein the third phase tuning element is configured to receive the first optical signal from the third directional coupler ($E_{o21'}$) and output an optical signal from the third phase tuning element ($E_{o21''}$);
wherein the fourth phase tuning element is configured to receive the second optical signal from the third directional coupler ($E_{o22'}$) and output an optical signal from the fourth phase tuning element ($E_{o22''}$);
wherein the fourth directional coupler is configured to receive the optical signal from the first phase tuning element ($E_{o11''}$) and the optical signal from the second phase tuning element ($E_{o12''}$) and output a first and second optical signals from the fourth directional coupler ($E_{o11}$, $E_{o12}$);
wherein the fifth directional coupler is configured to receive the optical signal from the third phase tuning element ($E_{o21''}$) and the optical signal from the fourth phase tuning element ($E_{o22''}$) and output a first and second optical signals from the fifth directional coupler ($E_{o21}$, $E_{o22}$);
wherein the first photodetector is configured to receive the first optical signal from the fourth directional coupler ($E_{o11}$) and output a first electrical signal from the first photodetector;
wherein the second photodetector is configured to receive the second optical signal from the fourth directional coupler ($E_{o12}$) and output a second electrical signal from the second photodetector;
wherein the third photodetector is configured to receive the first optical signal from the fifth directional coupler ($E_{o21}$) and output a third electrical signal from the third photodetector; and
wherein the fourth photodetector is configured to receive the second optical signal from the fifth directional coupler ($E_{o22}$) and output a fourth electrical signal from the fourth photodetector.

6. The device of claim 5, further comprising a processor configured to determine wavelength or frequency of the input optical signal based on the first, second, third and fourth electrical signals from the first, second, third and fourth photodetectors respectively.

7. A method of detecting an optical signal, comprising:
receiving, by a first directional coupler, an input optical signal ($E_i$), and outputting a first and second optical signals from the first directional coupler ($E_{i12}$, $E_{i21}$);
receiving, by a second directional coupler, the first optical signal from the first directional coupler ($E_{i12}$), and outputting a first and second optical signals from the second directional coupler ($E_{o11'}$, $E_{o12'}$);
receiving, by a third directional coupler, the second optical signal from the first directional coupler ($E_{i21}$), and outputting a first and second optical signals from the third directional coupler ($E_{o21'}$, $E_{o22'}$);
receiving, by a first phase tuning element, the first optical signal from the second directional coupler ($E_{o11'}$), and outputting an optical signal from the first phase tuning element ($E_{o11''}$);
receiving, by a second phase tuning element, the second optical signal from the second directional coupler ($E_{o12'}$), and outputting an optical signal from the second phase tuning element ($E_{o21''}$);
receiving, by a third phase tuning element, the first optical signal from the third directional coupler ($E_{o21'}$), and outputting an optical signal from the third phase tuning element ($E_{o12''}$);
receiving, by a fourth phase tuning element, the second optical signal from the third directional coupler ($E_{o22'}$), and outputting an optical signal from the fourth phase tuning element ($E_{o22''}$);
receiving, by a fourth directional coupler, the optical signal from the first phase tuning element ($E_{o11''}$) and the optical signal from the third phase tuning element ($E_{o12''}$), and outputting a first and second optical signals from the fourth directional coupler ($E_{o11}$, $E_{o12}$);
receiving, by a fifth directional coupler, the optical signal from the second phase tuning element ($E_{o21''}$) and the optical signal from the fourth phase tuning element ($E_{o22''}$), and outputting a first and second optical signals from the fifth directional coupler, ($E_{o21}$, $E_{o22}$);
receiving, by a first balance detector, the first and second optical signals from the fourth directional coupler ($E_{o11}$, $E_{o12}$), and outputting a first electrical signal from the first balance detector; and
receiving, by a second balance detector, the first and second optical signals from the fifth directional coupler ($E_{o21}$, $E_{o22}$), and outputting a second electrical signal from the second balance detector.

8. The method of claim 7, further comprising determining wavelength or frequency of the input optical signal based on the first and second electrical signals from the first and second balance detectors respectively.

9. The method of claim 7, wherein the first, second, third, fourth and fifth directional couplers are 50/50 couplers.

10. The method of claim 7, further comprising tuning the phase delay of the fourth tuning element to a constant $\pi/2$ throughout the detection range.

11. The method of claim 7, further comprising providing a known optical signal ($E_{i'}$) to the first directional coupler for calibration.

12. A method of detecting an optical signal, comprising:
receiving, by a first directional coupler, an input optical signal ($E_i$), and outputting a first and second optical signals from the first directional coupler ($E_{i12}$, $E_{i21}$);
receiving, by a second directional coupler, the first optical signal from the first directional coupler ($E_{i12}$), and outputting a first and second optical signals from the second directional coupler ($E_{o11'}$, $E_{o12'}$);

receiving, by a third directional coupler, the second optical signal from the first directional coupler ($E_{i21}$), and outputting a first and second optical signals from the third directional coupler ($E_{o21'}$, $E_{o22'}$);

receiving, by a first phase tuning element, the first optical signal from the second directional coupler ($E_{o11'}$), and outputting an optical signal from the first phase tuning element ($E_{o11''}$);

receiving, by a second phase tuning element, the second optical signal from the second directional coupler ($E_{o12'}$), and outputting an optical signal from the second phase tuning element ($E_{o12''}$);

receiving, by a third phase tuning element, the first optical signal from the third directional coupler ($E_{o21'}$), and outputting an optical signal from the third phase tuning element ($E_{o21''}$);

receiving, by a fourth phase tuning element, the second optical signal from the third directional coupler ($E_{o22'}$), and outputting an optical signal from the fourth phase tuning element ($E_{o22''}$);

receiving, by a fourth directional coupler, the optical signal from the first phase tuning element ($E_{o11''}$) and the optical signal from the second phase tuning element ($E_{o12''}$), and outputting a first and second optical signals from the fourth directional coupler ($E_{o11}$, $E_{o12}$);

receiving, by a fifth directional coupler, the optical signal from the third phase tuning element ($E_{o21''}$) and the optical signal from the fourth phase tuning element ($E_{o22''}$), and outputting a first and second optical signals from the fifth directional coupler, ($E_{o21}$, $E_{o22}$);

receiving, by a first photodetector, the first optical signal from the fourth directional coupler ($E_{o11}$), and outputting a first electrical signal from the first photodetector;

receiving, by a second photodetector, the second optical signal from the fourth directional coupler ($E_{o12}$), and outputting a second electrical signal from the second photodetector;

receiving, by a third photodetector, the first optical signal from the fifth directional coupler ($E_{o21}$), and outputting a third electrical signal from the third photodetector; and receiving, by a fourth photodetector, the second optical signal from the fifth directional coupler ($E_{o22}$), and outputting a fourth electrical signal from the fourth photodetector.

13. The method of claim 12, further comprising determining wavelength or frequency of the input optical signal based on the first, second, third and fourth electrical signals from the first, second, third and fourth photodetectors respectively.

14. The method of claim 12, further comprising providing a known optical signal ($E_{i''}$) to the first directional coupler for calibration.

* * * * *